United States Patent [19]

Kirch et al.

[11] 4,224,428

[45] Sep. 23, 1980

[54] POLYMERIZATION PROCESS

[75] Inventors: William Kirch; Paul A. Thompson, both of Clinton, Iowa

[73] Assignee: Chemplex Company, Rolling Meadows, Ill.

[21] Appl. No.: 8,757

[22] Filed: Feb. 2, 1979

Related U.S. Application Data

[62] Division of Ser. No. 925,417, Jul. 17, 1978.

[51] Int. Cl.$^2$ ............................ C08F 4/22; C08F 4/24; C08F 4/78
[52] U.S. Cl. ..................... 526/106; 252/428; 252/430; 252/431 R; 252/431 C; 526/352; 526/907
[58] Field of Search ........................................ 526/106

[56] References Cited

U.S. PATENT DOCUMENTS

| | | | |
|---|---|---|---|
| 3,622,521 | 11/1971 | Hogan et al. ........................ | 252/430 |
| 3,625,864 | 12/1971 | Horvath .............................. | 252/430 |
| 3,780,011 | 12/1973 | Pullukat et al. ................. | 260/94.9 D |
| 3,798,202 | 3/1974 | Nasser ............................... | 260/88.2 R |
| 3,879,362 | 4/1975 | Chalfont et al. ................. | 260/88.2 R |
| 3,882,096 | 5/1975 | Shida et al. ...................... | 260/94.9 D |
| 3,953,413 | 4/1976 | Hwang et al. ....................... | 526/350 |
| 3,976,632 | 8/1976 | Delap .................................. | 526/113 |
| 4,041,224 | 8/1977 | Hoff et al. .............................. | 526/96 |

*Primary Examiner*—Stanford M. Levin

*Attorney, Agent, or Firm*—Wegner, Stellman, McCord, Wiles & Wood

[57] ABSTRACT

A catalyst for polymerizing one or more 1-olefins and prepared by the process of (1) forming an initial mixture of a finely divided support such as silica and a chromium$^{+3}$ compound of either of the formulas

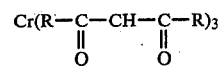

or Cr(OOCR)$_3$ or a mixture in an amount to provide about 0.1–30 weight percent of chromium in the finished catalyst and in which each R is individually selected from hydrogen or a hydrocarbyl group of 1–20 carbon atoms and the necessary hydrogen atoms, followed by (2) heating the mixture of (1) in a stream of dry, inert, and non-oxidizing gas and heating to a temperature of about 230°–540° C., and then (3) forming a second combination by adding a titanium compound to the product of (2) at a temperature ranging from 95°–370° C., and then (4) activating the mixture of (3) by heating in a dry, oxidizing atmosphere such as dry air to a temperature of about 370°–1100° C. The disclosure also includes a method of preparing such a catalyst and the method of polymerizing at least one 1-olefin with said catalyst.

10 Claims, No Drawings

POLYMERIZATION PROCESS

This is a division of application Ser. No. 925,417 filed July 17, 1978.

BACKGROUND OF THE INVENTION

This invention relates to a new catalyst, the method of making the catalyst and a method of making polyolefins with the catalyst in which the catalyst is prepared by the process of (1) forming an initial mixture of a finely divided support such as silica and a chromium$^{+3}$ compound of either of the formulas

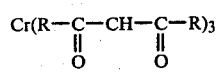

or $Cr(OOCR)_3$ or a mixture in an amount to provide about 0.1–30 weight percent of chromium in the finished catalyst and in which each R is individually selected from hydrogen or a hydrocarbyl group of 1–20 carbon atoms and the necessary hydrogen atoms, followed by (2) heating the mixture of (1) in a stream of dry, inert, and non-oxidizing gas to a temperature of about 230°–540° C., and then (3) forming a second combination by adding a titanium compound to the product of (2) at a temperature of about 95°–370° C., and then (4) activating the mixture of (3) by heating in a dry, oxidizing atmosphere such as dry air to a temperature of about 370°–1100° C.

Summary of the Invention

This invention provides an improved catalyst for polymerizing or copolymerizing 1-olefins such as ethylene particularly of 2–8 carbon atoms and copolymers of these olefins and 1-olefins of 2–20 carbon atoms, a method for preparing such catalysts and a method of producing solid polymers of olefins with these catalysts with the resulting olefin polymers having increased melt index and broadened molecular weight distribution. The melt index is measured as described in ASTM D-1238 72T. The polymerization may be carried out either in solution form process or particle form process with the particle form being preferred.

The most pertinent prior art of which applicants are aware are U.S. Pat. Nos. 3,622,521; 3,625,864; 3,780,011; 3,798,202; 3,879,362; 3,882,096; 3,953,413; 3,976,632 and 4,041,224. None of these prior patents, however, disclose the present invention.

Description of the Preferred Embodiments

This invention relates both to a catalyst and a process for the polymerization of 1-olefins containing 2 to 8 carbon atoms per molecule, and for the copolymerization of these 1-olefins with other 1-olefins containing 2 to 20 carbon atoms per molecule. The catalyst incorporates titanium, which is added at an important point in the preparation, to produce polymers with increased melt index and molecular weight distribution.

It has been common practice in the past to prepare a 1-olefin polymerization catalyst by combining a chromium-containing compound with a suitable catalyst support and activating this mixture by heating to an elevated temperature in an oxidizing atmosphere so that at least a portion of the chromium is converted to the hexavalent state. This type of catalyst can be used in a number of commercial polymerization processes to produce polymers with a characteristic melt index and molecular weight distribution. The ranges of melt indices and molecular weight distributions which can be produced by this type of catalyst are narrow, which restricts the number of polymer applications. By use of this invention, polymers with increased melt index and molecular weight distribution can be produced, thus extending the range of polymer products that can be produced by a given process.

The catalyst of this invention is prepared by first combining a suitable support selected from the group consisting of silica, alumina, zirconia, thoria, magnesia or mixtures thereof, with a chromium$^{+3}$ derivative of 1,3 di-ketone of the formula

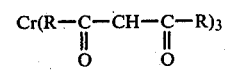

or a chromium$^{+3}$ carboxylate of the formula $Cr(OOCR)_3$ such that the chromium content of the finished catalyst is in the range of about 0.1–30 weight percent. In the formulas of the chromium compounds, R can be the same or different, and can be hydrogen or any hydrocarbyl group containing 1 to 20 carbon atoms. This first combination can be made by dry blending, blending in a fluidized bed, or by impregnating the support with a non-aqueous solution of the chromium compound. The preferred method for ease of preparation is the dry blending. The combination is then fluidized in a stream of dry, inert gas such as nitrogen and heated to a temperature from about 230°–540° C. for a period ranging from a few minutes to several hours. The heating temperature is critical to the performance of the catalyst. If it is not heated to a sufficient temperature in this step, so as to cause the interaction of the chromium compound and support, the finished catalyst will not produce polymer with increased melt index and broadened molecular weight distribution. One or two hold periods below and prior to said heating temperature are generally preferable.

A second combination is then formed by adding a titanium compound to the resulting composition, such that the titanium content of the finished catalyst is in the range of 0.5–10%. The titanium compound may be of the formula $R'_nTi(OR')_m$ or $(R'O)_mTi(OR')_n$ where R' can be the same or different and can be any hydrocarbyl group containing 1 to 12 carbon atoms, n is 0–3, m is 1–4 and m plus n equals 4. Preferably this addition is made by adding the liquid titanium compound to a fluidized bed, or by passing vapors of the titanium compound through the fluidized bed. Temperatures during the titanium addition are in the range of 95°–370° C. The active catalyst is then formed by heating this second combination in a dry oxidizing atmosphere such as dry air to a temperature in the range of 370°–1100° C. for a period of time necessary to convert the catalyst to an active state. This activation step is preferably carried out in the fluid bed.

The novel catalysts of this invention may be used in liquid-phase, solution or slurry processes or vapor-phase processes. In the liquid-phase operation, any $C_3$–$C_{12}$ saturated hydrocarbon may be used as a reaction medium or diluent. Other types of solvents, including aromatic hydrocarbons and chlorinated solvents may also be used. The polymerization of 1-olefins may be carried out in batch or continuous process. The catalyst is generally charged into the reactor as a slurry in the continuous process, but as dry powder in the batch process. The mode of charging the solvent and olefin to the reactor system may follow any conventional practice applicable to batch or continuous operation, respectively. A vigorous agitation of the reaction medium is of course greatly preferred and so is the provision for efficient cooling to control the reactor temperature.

In liquid-phase processes, the olefin polymer or copolymer is normally recovered by flashing off solvent without any intervening steps for removal of the catalyst. The activity of the catalysts described in this invention is normally greater than 3000 pounds of polymer per pound of catalyst so that catalyst removal is unnecessary for practical purposes. Reactor conditions are dependent on the type of olefin as well as the desired polymer properties. In the case of ethylene, reactor pressures may range from 50 to 1000 psig, temperatures from 65°–260° C. and solid levels from 5–60% by weight.

The following examples illustrate the invention by using the polymerization of ethylene as the exemplary 1-olefin. Each of the examples represents the test of a single catalyst in a pilot plant continuous particle form loop reactor of approximately 88 gallons capacity. The diluent was liquid isobutane, the reactor pressure was approximately 600 psig, the synthesis temperature was controlled with a reactor cooling water jacket, the catalyst was fed to the reactor as a slurry with liquid isobutane, and the ethylene was fed as needed to maintain a concentration of 3.0–6.0 weight percent in the reactor.

EXAMPLE 1

A catalyst was prepared by first dry blending a commercial grade of silica support (Davison Chemical Company grade 952 with a surface area of about 300 m$^2$/gm and pore volume of about 1.65 cc/gm) with chromium acetylacetonate for a chromium content of about 1.0%, then fluidizing this in a stream of dry, deoxygenated nitrogen, heating to 175° C. and holding there for three hours, then activating by heating in a stream of dry air to a temperature of 760° C. and holding there for six hours. This catalyst contained no titanium and was prepared as a control. When tested for ethylene polymerization, the catalyst produced polyethylene with a melt index of 0.41 at a synthesis temperature of 109° C. The $R_d$ (rheological dispersity), which is a measure of the molecular weight distribution, was 5.8.

EXAMPLE 2

A catalyst was prepared by first dry blending Davison Chemical Company grade 952 silica with chromium acetylacetonate for a chromium content of about 1.0%, then fluidizing this in a stream of dry, deoxygenated nitrogen, heating to a temperature of 175° C. and holding there for four hours, then liquid titanium tetraisopropoxide was added to the fluid bed, still at a temperature of 175° C., to achieve a titanium content of about 3.0%. This final combination was then activated by heating in a stream of dry air to a temperature of 760° C. and holding there for six hours. The catalyst was tested for ethylene polymerization, producing polyethylene with a melt index of 0.44 at a synthesis temperature of 109° C. The $R_d$ was 4.9. This melt index was about the same as that of the control and showed no increase due to the titanium, while the $R_d$ was actually lower than the control, indicating a more narrow molecular weight distribution.

EXAMPLE 3

A catalyst was prepared by first dry blending Davison Chemical Company grade 952 silica support with chromium acetylacetonate for a chromium content of about 1.0%, then fluidizing this in a stream of dry, deoxygenated nitrogen, heating to 205° C. and holding there for four hours, then cooling this to 175° C. and adding liquid titanium tetraisopropoxide to the bed for a nominal titanium content of 3.0%. This final combination was activated by heating in dry air to a temperature of 760° C. for a period of six hours. The catalyst was then tested for ethylene polymerization. At a synthesis temperature of 109° C. polyethylene with a melt index of 0.48 was produced. The $R_d$ was 4.7. As with Example 2, the melt index was about the same as the control and showed no significant increase due to the titanium. The $R_d$ was lower than the control, indicating a more narrow molecular weight distribution. The catalysts of Examples 2 and 3 were not prepared according to the method of this invention since they were not heated after the chromium addition and before the titanium addition to a temperature in the range of 230°–540° C. specified in this invention. Therefore, they did not produce polyethylene with increased melt index and broadened molecular weight distribution.

EXAMPLE 4

A catalyst was prepared according to the method of this invention by first dry blending the 952 silica support with a ball-milled mixture consisting of 75% chromium acetylacetonate and 25% of the 952 silica for a chromium content of about 1.0%. This mixture was then fluidized in a stream of dry, deoxygenated nitrogen and heated to 175° C. and held for three hours, then heated to 290° C. and held an additional three hours. This was then cooled to 205° C. where liquid titanium tetraisopropoxide was added to the fluid bed for a titanium content of about 3.0%. The catalyst was then activated by heating in dry air to a temperature of 760° C. and held there for six hours. This catalyst was used in a polymerization test at a synthesis temperature of 108° C. to produce polyethylene with a melt index of 0.83 and $R_d$ of 6.9. This represented a very substantial increase in the polymer melt index when compared to the control, despite the lower synthesis temperature which favors production of lower melt index polymer. The polymer $R_d$ was also substantially higher than the control, indicating a significant broadening of the molecular weight distribution.

EXAMPLE 5

A catalyst was prepared according to the method of this invention by first dry blending 952 silica support with chromium acetylacetonate for a chromium content of about 1.0%. This combination was then fluidized in a stream of dry, deoxygenated nitrogen, heated to 175° C. and held for three hours, heated to 290° C. and held for three hours, then cooled to 175° C. where liquid titanium tetraisopropoxide was added to the fluidized bed for a titanium content of about 3.0%. Final activation was carried out by heating in dry air to a temperature of 760° C. and holding for six hours. This catalyst was used at a reaction temperature of 108° C. to produce polyethylene with a melt index of 0.84 and $R_d$ of 6.9. The polymer produced in this Example was very similar to that produced in Example 4 and again shows the large increase in melt index and significant broadening of molecular weight distribution which can be achieved by the use of this invention.

TABLE I

| Example No. | Catalyst | Nominal % Ti | Reaction Temp. °C. | Melt Index[a] | $R_d$[b] |
|---|---|---|---|---|---|
| 1 (Control) | [952 + Cr(AcAc)₃ N₂ 175° C. (3 Hrs.)] activate in air 760° C. | None | 109 | 0.41 | 5.8 |
| 2 | [952 + Cr(AcAc)₃ N₂ 175° C. (4 Hrs.)] + Ti, activate in air 760° C. | 3.0 | 109 | 0.44 | 4.9 |
| 3 | [952 + Cr(AcAc)₃ N₂ 205° C. (4 Hrs.)] + Ti, activate in air 760° C. | 3.0 | 109 | 0.48 | 4.7 |
| 4 | [952 + Cr(AcAc)₃ N₂ 175° C. (3 Hrs.) 290° C. (3 Hrs.)] cool to 205° C. add Ti, activate in air 760° C. | 3.0 | 108 | 0.83 | 6.9 |
| 5 | [952 + Cr(AcAc)₃ N₂ 175° C. (3 Hrs.) 290° C. (3 Hrs.)] cool to 175° C. add Ti, activate in air 760° C. | 3.0 | 108 | 0.84 | 6.9 |

Cr(AcAc)₃ is chromium acetylacetonate
[a]ASTM D-1238-62T
[b]Prediction of HDPE Processing Behavior from Rheological Measurements, M. Shida, L. V. Cancio, Poly. Eng. & Science, Vol. II, No. 2, March, 1971.

These examples illustrate a large increase in polymer melt index, and a significant broadening of weight distribution, which result from use of this invention and also show the criticality of the heating step after chromium addition and before titanium addition.

In summary, this invention can be used to produce 1-olefin polymers with increased melt index and broadened molecular weight distribution, thus adding flexibility to the product line which can be produced by a given polymerization process. Preparation of the catalyst is quite simple and can be accomplished entirely within existing catalyst activation equipment without major alterations. Hexavalent chromium is positively excluded during all of the preparation steps in which the catalyst is handled in the open, thereby significantly reducing the health hazards to workers. Heating of the catalyst after chromium addition and before titanium addition is critical to the catalyst's performance. Polymer with increased melt index and broadened molecular weight distribution will not be produced if the heating in this step is not done to the temperature range specified in this invention.

All percentages herein are by weight.

Having described our invention as related to the embodiments set out herein, it is our intension that the invention be not limited by any of the details of description, unless otherwise specified, but rather be construed broadly within its spirit and scope as set out in the appended claims.

We claim:

1. The method of making polymers of 1-olefins of 2-8 carbon atoms and copolymers of said olefins and 1-olefins of 2-20 carbon atoms which comprises polymerizing said olefins under polymerizing conditions with a catalyst prepared by the process of (1) forming a mixture of a finely divided, difficultly reducible, support of the class consisting of silica, alumina, zirconia, thoria, magnesia and mixtures thereof and a chromium⁺³ derivative of a beta-dicarbonyl compound of the formula

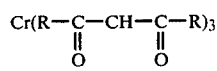

or a chromic carboxylate of the formula Cr(OOCR)₃ in an amount to provide about 0.1-30 weight percent of chromium in said catalyst, wherein each R is individually selected from hydrogen or a hydrocarbyl group of 1-20 carbon atoms, (2) heating the mixture of (1) in a stream of dry, inert, and non-oxidizing gas to a temperature of about 230°-540° C., and then (3) forming a second combination by adding a titanium compound to the product of (2) at a temperature ranging from 95°-370° C., said titanium compound having the formula (R')ₙTi(OR')ₘ or (R'O)ₘTi(OR')ₙ in which R' is the same or different and is hydrogen or a hydrocarbyl group of 1-12 carbon atoms and in which m is 1-4, n is 0-3 and m plus n equals 4 and being present in an amount to give about 0.5-10 weight percent of titanium in said catalyst, and then (4) activating the mixture of (3) by heating in a stream of dry, oxidizing gas to a temperature of about 370°-1100° C.

2. The method of claim 1 wherein said chromium compound is

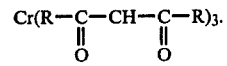

3. The method of claim 1 wherein said chromium compound is Cr(OOCR))₃.

4. The method of claim 1 wherein said titanium compound is (R')ₙTi(OR')ₘ.

5. The method of claim 1 wherein said titanium compound is (R'O)ₘTi(OR')ₙ.

6. The method of claim 1 wherein said dry, non-oxidizing gas stream comprises a substantially oxygen free inert gas of the class consisting of nitrogen, helium, argon, neon, krypton and mixtures thereof.

7. The method of claim 1 wherein said dry, non-oxidizing gas stream comprises a reducing gas of the class consisting of hydrogen, carbon monoxide, and mixtures thereof with one or more substantially oxygen free inert gases of the class consisting of nitrogen, helium, argon, neon, krypton and mixtures thereof.

8. The method of claim 7 wherein said reducing gas comprises a mixture of nitrogen and carbon monoxide.

9. The method of claim 1 wherein said activation gas comprises dry oxygen or a nitrogen oxide.

10. The method of claim 1 wherein said activation gas of (4) comprises dry air or other mixtures of oxygen and nitrogen.

* * * * *